Dec. 20, 1932.  W. W. GIFFEN ET AL  1,891,383
METHOD OF MAKING LIQUID COFFEE EXTRACT
Filed Sept. 24, 1930
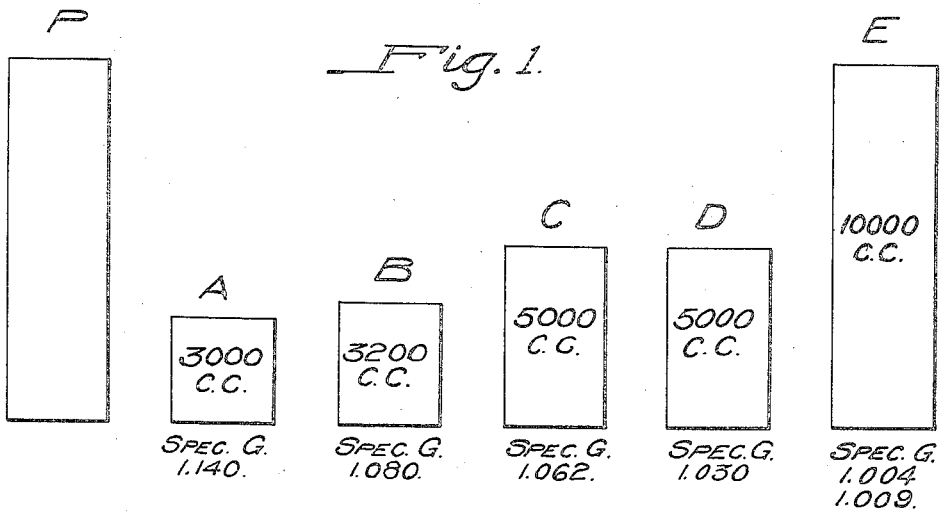
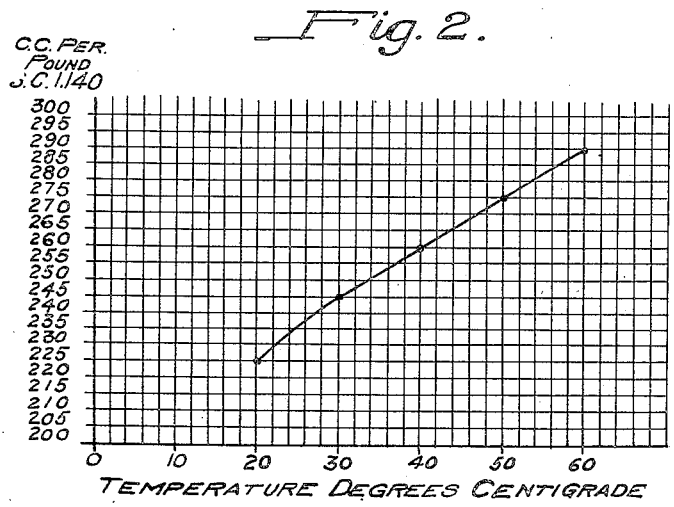
INVENTOR
William W. Giffen and
Clinton W. Carter
BY William B. Jaspert
ATTORNEY Patented Dec. 20, 1932

1,891,383

UNITED STATES PATENT OFFICE

WILLIAM W. GIFFEN, OF PITTSBURGH, AND CLINTON W. CARTER, OF MOUNT LEBANON, PENNSYLVANIA, ASSIGNORS TO THE INTERNATIONAL LIQUID COFFEE COMPANY, OF PITTSBURGH, PENNSYLVANIA, A CORPORATION OF PENNSYLVANIA

METHOD OF MAKING LIQUID COFFEE EXTRACT

Application filed September 24, 1930. Serial No. 484,126.

This invention relates to improvements in the method of making liquid extract of coffee by the infusion process and it is among the objects thereof to provide a process for the production of a concentrated liquid extract of coffee which shall be instantly soluble in either hot or cold water and which shall contain substantially all of the desirable properties of the coffee bean.

The process consists briefly of passing a given solvent through a given mass of roasted and ground coffee at a given temperature and drawing off the above solvent in a succession of percolates of given volume and of gradually decreasing strength and using the above percolates to extract a fresh mass of coffee in like manner until the desired concentration is reached.

The above process is similar to that disclosed by various prior art patents, including the patent to Frank L. Slocum et al, Number 1,687,112 patented Oct. 9, 1928, none of which, however, have attained commercial success.

In the prior art methods the concentrated infusions or extracts were produced at temperatures either too high or too low to be of suitable cup quality without sacrificing volume and increasing the cost of the product beyond practical limits. The high temperature processes conducted at temperatures from 65 to 100 degrees cent. are unsatisfactory because of the loss of some desirable properties which are volatile and lost in evaporation, and also because of the presence of aromatic oils which are liberated at the higher temperatures and which are detrimental to the flavor and taste of the coffee product.

The low temperature processes have been unsatisfactory because of the prolonged extraction period which requires contact of the liquid with the ground coffee for a long period of time whereby it acquires the woody taste of the coffee bean, and the coffee becomes rancid. The low temperature process has the further disadvantage of producing a minimum yield of the product, as high as 30% of the caffein and desirable properties being retained in the coffee grounds, and the extract not being sterile quickly deteriorates and causes spoilage when left standing after any appreciable length of time.

In accordance with the present invention these difficulties are overcome by employing a rapid infusion and extracting process at a medium temperature which is maintained uniform throughout the various steps of the process, whereby the product is sterile and brings all the valuable soluble components of the bean into an harmonious emulsion, with a maximum yield of liquid extract per pound of coffee having a high specific gravity.

In carrying out the invention we utilize a low temperature varying between 30 and 50 degrees cent., the preferred temperature being 45 degrees cent., which produces a sterile product, and we maintain the temperature constant throughout the successive steps of the process. Freshly roasted and ground coffee is placed in a container which may for convenience be designated a percolator, and liquid of different measured volumes is successively passed through the ground coffee to produce a concentrated liquid extract which is the finished product. Apparatus suitable for carrying out the process is disclosed in the aforementioned Slocum patent and consists of a percolator and a series of containers for the successive percolates, the containers being connected to the percolators by suitable piping which is provided with valves to control the flow of liquid to and from the percolator.

The invention will be more clearly explained in connection with the accompanying drawing constituting a part hereof and in which Fig. 1 is a view diagrammatically illustrating the apparatus and the different fractions of measured volume employed in carrying out the process, and Fig. 2 is a curve graphically illustrating the yield of extract and the specific gravities of the product made at different temperatures.

With reference to Fig. 1, "P" designates the percolator or container in which the freshly roasted and ground coffee beans are charged and A, B, C, D and E designate the containers to and from which the successive percolates are conducted in carrying out the process which may be described as comprising three steps, as follows:

First step

A given amount of roasted and ground coffee is dampened with approximately 60% of its weight of fresh water at a temperature of 30 to 50 degrees cent., the preferred temperature being 45 degrees cent., and charged into the container or percolator P.

An additional volume of fresh water equal to approximately the weight of the original ground coffee and of the same temperature as the dampening water is added to moisten the coffee, and the mass is allowed to macerate in the closed container P for a period of from 6 to 12 hours, keeping the temperature as nearly constant as possible. After maceration, a volume of fresh water at a temperature of 45 degrees cent. equal to approximately the weight of the original ground coffee is added and an equal volume of the infusion is withdrawn from the tank P, as the first fraction. After withdrawing the first fraction from the percolator, fresh water is added and withdrawn as follows: Sufficient water is added at a temperature of 45 degrees cent. to withdraw a solution of a volume sufficient to dampen a second mass of roasted and ground coffee of equal volume with the first mass of coffee such volume being 60% by weight of the original ground coffee, and more water is added to draw off a second solution of a volume which by weight is equal to the weight of the original ground coffee. A third volume equal to the next preceding volume is added and an equal volume is withdrawn, and a final solution of a volume sufficient to complete extraction of the ground coffee is drawn from the original mass by adding sufficient fresh water to produce a volume approximately 300% of the weight of the original ground coffee.

Second step

The second step in the process consists of dampening a fresh batch of roasted and ground coffee with the first fraction or most highly concentrated solution, and the successive fractions extracted in the manner set forth under the first step of the process are passed through the percolator in the same manner as explained in connection therewith, the temperature being constantly maintained at substantially 45 degrees cent. In the second step of the process, the first solution or fraction drawn off is the finished highly concentrated product which is removed for bottling and is ready for use. The second fraction is used to dampen a fresh batch of coffee as above, and the third and fourth fractions are used precisely as the second and third fractions in the first step. The fifth solution is then added to replace the removed solutions, and a sixth or final solution may be drawn from the percolator to be used as provided in the final or third step of the process.

Third step

When a sixth solution is employed it is concentrated under vacuum at a temperature of 45 degrees to the consistency of the original finished product and is then added to the original finished product, increasing the yield from a given amount of coffee approximately 16% and reduces waste to a minimum.

With reference to Fig. 1 of the drawing, the relative volumes of the extracts constituting the different fractions of the percolates, are graphically shown by the Figures A, B, C, D and E, the volume being represented in cubic centimeters based on the use of eleven pounds of coffee in the container P. For example, volume A which is 3000 cc. represents the first fraction and is the finished extract in the second step of the process. The volume 3200 cc. designating the fraction B is the dampening fluid in the second and subsequent steps of the process, and the total volume of B and C fractions is the volume of liquid in which the ground coffee stands during the macerating period. D and E represent fractions drawn in volumes of 5000 cc. and 10000 cc. respectively, in the second and subsequent steps.

In drawing off the fraction E sufficient water must be added to the percolate to make up the volume A which is the first fraction drawn and which represents the finished product plus the amount of liquid lost when the dampened exhausted coffee grounds are discarded.

It will be noted that the different fractions A to E inclusive, are of different specific gravities and that the first fraction A of the second step has a specific gravity of 1.140. This is the specific gravity of the final product or extract when the process is conducted at a constant temperature of 45 degrees cent.

With reference to Fig. 2 of the drawing, the curve represents the volume of liquid extract of 1.140 specific gravity in cubic centimeters produced from one pound of ground coffee at temperatures varying from 20 to 60 degrees cent. The production increases with an increase of temperature, the curve representing almost a 45-degree angle, indicating that the higher the temperature, the higher the yield, but as has been previously pointed out, it is desired to conduct the entire process at a temperature not below 30 degrees or in excess of 50 degrees, and preferably at 45 degrees cent.

As is clear from Fig. 2, considerable sacrifice of volume of yield is made by operating at 45 degrees cent. but we have discovered that if the process is conducted at higher temperatures, the quality of the product is materially affected, and if the process is conducted at temperatures below 30 degrees at least 30% of the desirable properties of the coffee are wasted. At 20 degrees cent. the yield is about 30% less than at 45 degrees.

We claim:

1. The method of preparing liquid coffee extract which comprises infusing roasted ground coffee with water at a temperature of substantially 45 degrees cent., drawing off the infusion in separate successive fractions of measured volume, using all fractions in succession to infuse a fresh portion of coffee from which the highly concentrated extract is withdrawn as the first fraction, and at all times from the beginning to the end of said process maintaining the infusion at a temperature of 45 degrees cent.

2. The method of preparing liquid coffee extract which comprises infusing roasted ground coffee with water at a temperature of between 30 to 50 degrees cent., drawing off the infusion in separate successive fractions of measured volume, using all fractions in succession to infuse a fresh portion of coffee from which the highly concentrated extract is withdrawn as the first fraction, and at all times from the beginning to the end of said process maintaining the infusion at a temperature of between 30 to 50 degrees cent.

3. The step in the method of preparing liquid coffee extract which comprises infusing roasted ground coffee with water equal to approximately the weight of the ground coffee, allowing the mass to macerate for a period of from 6 to 12 hours, adding water equal in volume to approximately the weight of the original ground coffee, and withdrawing the infusion from the coffee, and at all times from the beginning to the end of said process maintaining the infusion at a temperature of between 30 to 50 degrees cent.

4. The step in the method of preparing liquid coffee extract which comprises infusing roasted ground coffee with water equal to approximately the weight of the ground coffee, allowing the mass to macerate for a period of from 6 to 12 hours, withdrawing the infusion from the ground coffee and simultaneously replacing the withdrawn volume with an equal volume of fresh water and adding sufficient additional water to withdraw, 1st, a solution of a volume sufficient to dampen a second mass of roasted and ground coffee of equal volume with the first mass of coffee; 2nd, a solution of a volume equal to the volume of water previously added to the dampened mass; 3rd, a solution equal to the volume of water added after maceration; and a final solution of a volume sufficient to complete extraction of the ground coffee, such final solution being of a volume approximately 300% of the weight of the original ground coffee, and at all times from the beginning to the end of said process maintaining the infusion at a temperature between 30 and 50 degrees cent.

5. The step in the method of preparing liquid coffee extract which comprises dampening a fresh batch of roasted and ground coffee with the first or most highly concentrated solution produced by the process set forth in claim 4, adding the second fraction to the solution and allowing the infusion to macerate for a period of from 6 to 12 hours, adding successive fractions extracted in the manner set forth in claim 4, and simultaneously withdrawing the highly concentrated finished extract in volume substantially equal to the solution employed for dampening the original ground and roasted mass, and adding sufficient fresh water to replenish the final fraction to its original volume, and at all times from the beginning to the end of said process maintaining the infusion at a temperature between 30 and 50 degrees cent.

6. The step in the method of preparing liquid coffee extract which comprises infusing roasted ground coffee with water at a temperature of between 30 to 50 degrees cent., drawing off the infusion in separate successive fractions of different volume, using all fractions in succession to infuse a fresh portion of coffee from which the highly concentrated extract is withdrawn as the first fraction, concentrating the final fraction under vacuum at a temperature of between 30 to 50 degrees cent. to the consistency of the first fraction or finished product, and adding said concentrated solution to the final product to increase the yield.

7. The method of preparing liquid coffee extract which comprises macerating a measured solution of a previously extracted infusion of roasted and ground coffee at a temperature between 30 and 50 degrees cent. until it has an average specific gravity of substantially 1.140, and withdrawing the concentrated solution which constitutes the finished product.

8. The method of preparing liquid coffee extract which comprises macerating a solution of a previously extracted infusion of roasted and ground coffee at a temperature of substantially 45 degrees cent. until it has an average specific gravity of substantially 1.140, and withdrawing the concentrated solution which constitutes the finished product.

In testimony whereof we have hereunto set our hands.

WILLIAM W. GIFFEN.
CLINTON W. CARTER.